US011163617B2

(12) United States Patent
Balik et al.

(10) Patent No.: US 11,163,617 B2
(45) Date of Patent: Nov. 2, 2021

(54) PROACTIVE NOTIFICATION OF RELEVANT FEATURE SUGGESTIONS BASED ON CONTEXTUAL ANALYSIS

(71) Applicant: Microsoft Technology Licensing, LLC, Redmond, WA (US)

(72) Inventors: Patricia Hendricks Balik, Seattle, WA (US); Anav Silverman, Sammamish, WA (US); Alyssa Rachel Mayo, Seattle, WA (US); Shikha Devesh Desai, Bellevue, WA (US); Gwenyth Alanna Vabalis Hardiman, Seattle, WA (US); Penelope Ann Collisson, Edmonds, WA (US); Yu Been Lee, Bellevue, WA (US); Susan Michele Hendrich, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 54 days.

(21) Appl. No.: 16/169,731

(22) Filed: Oct. 24, 2018

(65) Prior Publication Data
US 2020/0097340 A1 Mar. 26, 2020

Related U.S. Application Data

(60) Provisional application No. 62/734,761, filed on Sep. 21, 2018.

(51) Int. Cl.
*G06F 3/048* (2013.01)
*G06F 3/0489* (2013.01)
(Continued)

(52) U.S. Cl.
CPC .............. *G06F 9/542* (2013.01); *G06F 16/35* (2019.01); *G06F 16/9038* (2019.01); *G06N 20/00* (2019.01); *G06F 3/04895* (2013.01)

(58) Field of Classification Search
CPC ...... G06F 3/0481–3/0489; G06F 9/542; G06F 16/35; G06F 3/0482; G06F 3/04817;
(Continued)

(56) References Cited

U.S. PATENT DOCUMENTS

| 7,788,247 B2 * | 8/2010 | Wang | G06F 16/958 |
| | | | 707/705 |
| 8,386,929 B2 * | 2/2013 | Zaika | G06F 3/0482 |
| | | | 707/805 |

(Continued)

FOREIGN PATENT DOCUMENTS

WO 2018111702 A1 6/2018

OTHER PUBLICATIONS

Baralis, et al., "Learning From Summaries: Supporting e-Learning Activities by Means of Document Summarization", In Proceedings of IEEE Transactions on Emerging Topics in Computing, vol. 4, Issue 3, Jul. 1, 2016, pp. 416-428.

(Continued)

*Primary Examiner* — Steven B Theriault

(57) ABSTRACT

The present disclosure relates to processing operations configured to tailor notifications of productivity feature suggestions based on predictive relevance to a context associate with user access to an electronic document. Machine learning modeling executes a contextual evaluation of user access to predictively determine relevance of a suggestion that relates to: 1) a confidence in the quality of the suggestion; and 2) a timing prediction as to the urgency for surfacing the suggestion to the user so that the suggestion is most applicable. Example notifications are proactive interruptions that aim to aid processing efficiency in task execution as well as an improve user interface experience when users work with an application/service and/or an application platform that comprises a suite of applications/services. A manner in which the notification is presented may vary based on the (Continued)

confidence in the relevance of the suggestion and timing relevance for interrupting a user's workflow.

20 Claims, 7 Drawing Sheets

(51) Int. Cl.
  *G06F 9/54* (2006.01)
  *G06F 16/9038* (2019.01)
  *G06F 16/35* (2019.01)
  *G06N 20/00* (2019.01)
(58) Field of Classification Search
  CPC .. G06F 3/0483; G06F 3/0484; G06F 3/04847; G06F 3/04895; G06N 20/00; G06Q 10/10
  See application file for complete search history.

(56) References Cited

U.S. PATENT DOCUMENTS

| | | | | |
|---|---|---|---|---|
| 8,515,950 | B2* | 8/2013 | Gao | G06F 16/9535 707/723 |
| 8,620,842 | B1* | 12/2013 | Cormack | G06F 16/93 706/12 |
| 9,094,363 | B1* | 7/2015 | Lin | H04L 69/24 |
| 9,235,978 | B1* | 1/2016 | Charlton | G06F 9/542 |
| 9,372,858 | B1* | 6/2016 | Vagell | G06F 40/166 |
| 9,373,078 | B1* | 6/2016 | Olsson | G06F 16/2462 |
| 9,396,177 | B1* | 7/2016 | Kursun | G06F 40/20 |
| 9,449,042 | B1* | 9/2016 | Evans | G06F 8/36 |
| 9,584,565 | B1* | 2/2017 | Ho | H04L 65/403 |
| 9,769,104 | B2* | 9/2017 | Appelman | G06Q 10/10 |
| 9,881,010 | B1 | 1/2018 | Gubin et al. | |
| 9,959,296 | B1* | 5/2018 | Gubin | G06F 16/2465 |
| 10,002,199 | B2* | 6/2018 | Matamala | G06F 16/29 |
| 10,120,746 | B1* | 11/2018 | Mehr | H04L 63/1425 |
| 10,133,791 | B1* | 11/2018 | Chan | G06N 5/047 |
| 10,135,781 | B1* | 11/2018 | Yeskel | H04L 67/306 |
| 10,225,291 | B2* | 3/2019 | Wilde | H04L 67/06 |
| 10,567,535 | B2* | 2/2020 | Brown | G06Q 10/109 |
| 2002/0054117 | A1* | 5/2002 | van Dantzich | G06F 3/0482 715/766 |
| 2002/0087649 | A1* | 7/2002 | Horvitz | G06Q 10/107 709/207 |
| 2003/0014491 | A1* | 1/2003 | Horvitz | G06Q 10/109 709/206 |
| 2003/0046421 | A1* | 3/2003 | Horvitz | G06Q 10/107 709/238 |
| 2003/0131069 | A1* | 7/2003 | Lucovsky | G06F 21/335 709/217 |
| 2003/0135558 | A1* | 7/2003 | Bellotti | G06Q 10/107 709/206 |
| 2003/0139932 | A1* | 7/2003 | Shao | G06F 9/451 704/275 |
| 2004/0002932 | A1* | 1/2004 | Horvitz | G06Q 10/107 706/46 |
| 2004/0003042 | A1* | 1/2004 | Horvitz | G06Q 10/109 709/204 |
| 2004/0098462 | A1* | 5/2004 | Horvitz | G05B 19/404 709/207 |
| 2004/0128359 | A1* | 7/2004 | Horvitz | G05B 19/404 709/207 |
| 2004/0216039 | A1* | 10/2004 | Lane | G06F 40/166 715/229 |
| 2007/0214228 | A1* | 9/2007 | Horvitz | G06Q 10/107 709/207 |
| 2008/0195945 | A1* | 8/2008 | Vaughan | G06F 3/0482 715/708 |
| 2008/0294678 | A1* | 11/2008 | Gorman | G06F 16/9537 |
| 2009/0119324 | A1* | 5/2009 | Simard | G06F 16/93 |
| 2009/0157595 | A1* | 6/2009 | Gubitz | G06F 3/1293 |
| 2010/0070851 | A1* | 3/2010 | Chen | G06F 40/14 715/236 |
| 2010/0217717 | A1* | 8/2010 | Overby | G06Q 10/00 705/311 |
| 2011/0246937 | A1* | 10/2011 | Roberts | G11B 27/34 715/810 |
| 2012/0060082 | A1* | 3/2012 | Edala | G06F 16/36 715/231 |
| 2012/0072845 | A1* | 3/2012 | John | G06F 16/48 715/738 |
| 2012/0233534 | A1* | 9/2012 | Vanderwende | G06F 40/279 715/230 |
| 2012/0233544 | A1* | 9/2012 | Roy | G06F 16/00 715/274 |
| 2012/0239646 | A1 | 9/2012 | Bailey et al. | |
| 2012/0265528 | A1 | 10/2012 | Gruber et al. | |
| 2012/0303629 | A1* | 11/2012 | Klein | G06F 16/907 707/741 |
| 2012/0304247 | A1* | 11/2012 | Badger | G06F 16/951 726/1 |
| 2013/0110943 | A1* | 5/2013 | Menon | G06Q 10/107 709/206 |
| 2013/0196615 | A1* | 8/2013 | Zalmanovitch | H04M 15/7652 455/405 |
| 2013/0290347 | A1* | 10/2013 | Saib | G06F 16/9535 707/748 |
| 2013/0316744 | A1* | 11/2013 | Newham | H04M 1/72569 455/458 |
| 2013/0346408 | A1* | 12/2013 | Duarte | G06F 16/285 707/737 |
| 2014/0000438 | A1* | 1/2014 | Feis | G10G 1/00 84/453 |
| 2014/0040238 | A1* | 2/2014 | Scott | G06F 16/332 707/722 |
| 2014/0052680 | A1* | 2/2014 | Nitz | G06N 5/04 706/46 |
| 2014/0059144 | A1* | 2/2014 | Lehmann | G06Q 10/10 709/206 |
| 2014/0129661 | A1* | 5/2014 | Thyagaraja | H04L 51/24 709/207 |
| 2014/0253319 | A1* | 9/2014 | Chang | H04M 1/72522 340/521 |
| 2014/0278746 | A1* | 9/2014 | Kolowich | G06Q 30/0201 705/7.29 |
| 2015/0185995 | A1* | 7/2015 | Shoemaker | G06F 3/0484 715/708 |
| 2015/0213024 | A1* | 7/2015 | Frankel | H04L 12/1895 707/758 |
| 2015/0229648 | A1* | 8/2015 | Avery | G06F 21/6218 726/30 |
| 2015/0358315 | A1 | 12/2015 | Cronin | |
| 2016/0018974 | A1 | 1/2016 | Welton et al. | |
| 2016/0078362 | A1* | 3/2016 | Christodorescu | G06F 21/554 706/12 |
| 2016/0103835 | A1* | 4/2016 | Zupancic | G06F 16/24578 707/749 |
| 2016/0248865 | A1* | 8/2016 | Dotan-Cohen | H04L 67/26 |
| 2016/0253304 | A1* | 9/2016 | Evers | G06F 40/166 715/225 |
| 2016/0267283 | A1* | 9/2016 | Takaai | G06F 21/6218 |
| 2016/0335327 | A1* | 11/2016 | Kanakadandi | G06N 20/00 |
| 2016/0350812 | A1 | 12/2016 | Priness et al. | |
| 2016/0360336 | A1* | 12/2016 | Gross | H04M 1/72403 |
| 2017/0048285 | A1* | 2/2017 | Pearl | H04L 41/0823 |
| 2017/0083929 | A1* | 3/2017 | Bates | G06Q 10/067 |
| 2017/0085678 | A1* | 3/2017 | Babu | H04L 67/306 |
| 2017/0108995 | A1* | 4/2017 | Ali | G06F 3/0481 |
| 2017/0178048 | A1* | 6/2017 | Ghotbi | G06N 3/006 |
| 2017/0220359 | A1* | 8/2017 | Aguilar-Gamez | G06F 16/10 |
| 2017/0220536 | A1* | 8/2017 | Chiba | G06F 40/253 |
| 2017/0243465 | A1* | 8/2017 | Bourne, Jr. | G06Q 10/06314 |
| 2017/0249067 | A1* | 8/2017 | Marzke | G06F 16/24575 |
| 2017/0322678 | A1* | 11/2017 | Silvis | G06F 3/0481 |
| 2017/0329812 | A1* | 11/2017 | Evers | G06F 16/93 |
| 2017/0344620 | A1* | 11/2017 | Modarresi | G06K 9/00 |
| 2018/0004544 | A1* | 1/2018 | Vasiltschenko | G06F 9/454 |
| 2018/0004547 | A1 | 1/2018 | Hayes et al. | |
| 2018/0006989 | A1* | 1/2018 | Dotan-Cohen | H04L 67/22 |

(56) References Cited

U.S. PATENT DOCUMENTS

| | | | |
|---|---|---|---|
| 2018/0025084 A1* | 1/2018 | Conlan | G06F 16/955 707/734 |
| 2018/0053207 A1* | 2/2018 | Modani | G06Q 30/0244 |
| 2018/0081503 A1* | 3/2018 | Green | G06N 3/084 |
| 2018/0123815 A1* | 5/2018 | Milvaney | H04L 12/1827 |
| 2018/0129371 A1* | 5/2018 | Fowler | G06Q 10/063116 |
| 2018/0146070 A1* | 5/2018 | Lopushenko | H04L 67/306 |
| 2018/0188901 A1* | 7/2018 | Shtuchkin | G06Q 10/10 |
| 2018/0189343 A1* | 7/2018 | Embiricos | G06F 16/2358 |
| 2018/0189369 A1* | 7/2018 | Baek | G06F 16/27 |
| 2018/0196697 A1* | 7/2018 | Standefer | G06Q 10/063112 |
| 2018/0196784 A1 | 7/2018 | Kumar et al. | |
| 2018/0253409 A1* | 9/2018 | Carlson | G06F 40/197 |
| 2018/0267950 A1* | 9/2018 | Brandao | G06F 3/0481 |
| 2018/0352091 A1* | 12/2018 | Puri | H04M 7/0036 |
| 2018/0359199 A1* | 12/2018 | Nguyen | G06Q 10/107 |
| 2018/0365325 A1* | 12/2018 | Gireesha | G06F 16/90324 |
| 2019/0005688 A1* | 1/2019 | Alvarez | G06Q 50/01 |
| 2019/0014205 A1* | 1/2019 | Miloseski | H04M 1/72583 |
| 2019/0068526 A1* | 2/2019 | Xie | H04L 67/20 |
| 2019/0079909 A1* | 3/2019 | Purandare | G06Q 10/101 |
| 2019/0138645 A1* | 5/2019 | Zhang | G06F 16/332 |
| 2019/0140995 A1* | 5/2019 | Roller | G06F 40/295 |
| 2019/0220438 A1* | 7/2019 | Pal | G06F 16/90324 |
| 2019/0251197 A1* | 8/2019 | Li | G06F 16/168 |
| 2019/0258498 A1* | 8/2019 | Chandan | G06F 40/20 |
| 2019/0258949 A1* | 8/2019 | Reyes | G06Q 30/0631 |
| 2019/0266573 A1* | 8/2019 | Radhakrishnan | G06Q 10/1095 |
| 2019/0272553 A1* | 9/2019 | Saini | G06N 7/005 |
| 2019/0278844 A1* | 9/2019 | Brixey | G06F 3/04842 |
| 2019/0334848 A1* | 10/2019 | Chen | H04L 51/26 |
| 2019/0334849 A1* | 10/2019 | Bostick | H04L 51/32 |
| 2019/0361720 A1* | 11/2019 | Balachandran | G06F 40/253 |
| 2019/0377830 A1* | 12/2019 | Weldemariam | G06F 16/9577 |
| 2019/0384622 A1* | 12/2019 | Chen | G06F 3/0482 |
| 2020/0004808 A1* | 1/2020 | Yao | G06N 20/00 |
| 2020/0097586 A1* | 3/2020 | Balik | G06F 16/93 |

OTHER PUBLICATIONS

Liu, et al., "A Review of Structured Document Retrieval (SOR) Technology to Improve Information Access Performance in Engineering Document Management", In Journal of Computers in Industry, vol. 59, No. 1, Oct. 24, 2007, pp. 3-16.

"International Search Report and Written Opinion Issued in PCT Application No. PCT/US2019/039649", dated Oct. 2, 2019, 24 Pages.

"International Search Report and Written Opinion Issued in PCT Application No. PCT/US2019/039652", dated Oct. 17, 2019, 32 Pages.

Rao, Ramana, "Knowledge Management—From Unstructured Data to Actionable Intelligence", In IEEE IT Professional, vol. 5, Issue 6, Nov. 1, 2003, pp. 29-35.

Zorrilla, et al., "Data Webhouse to Support Web Intelligence in E-Learning Environments", In Proceedings of IEEE International Conference on Granular Computing, vol. 2, Jul. 25, 2005, pp. 722-727.

Ranjan, Ritcha, et al., "Explore in Docs, Sheets and Slides makes work a breeze—and makes you look good, too", Retrieved from: https://docs.googleblog.com/2016/09/ExploreinDocsSheetsSlides.html, Sep. 29, 2016, 4 Pages.

"Non Final Office Action Issued in U.S. Appl. No. 16/169,648", dated Jan. 25, 2021, 12 Pages.

* cited by examiner

100

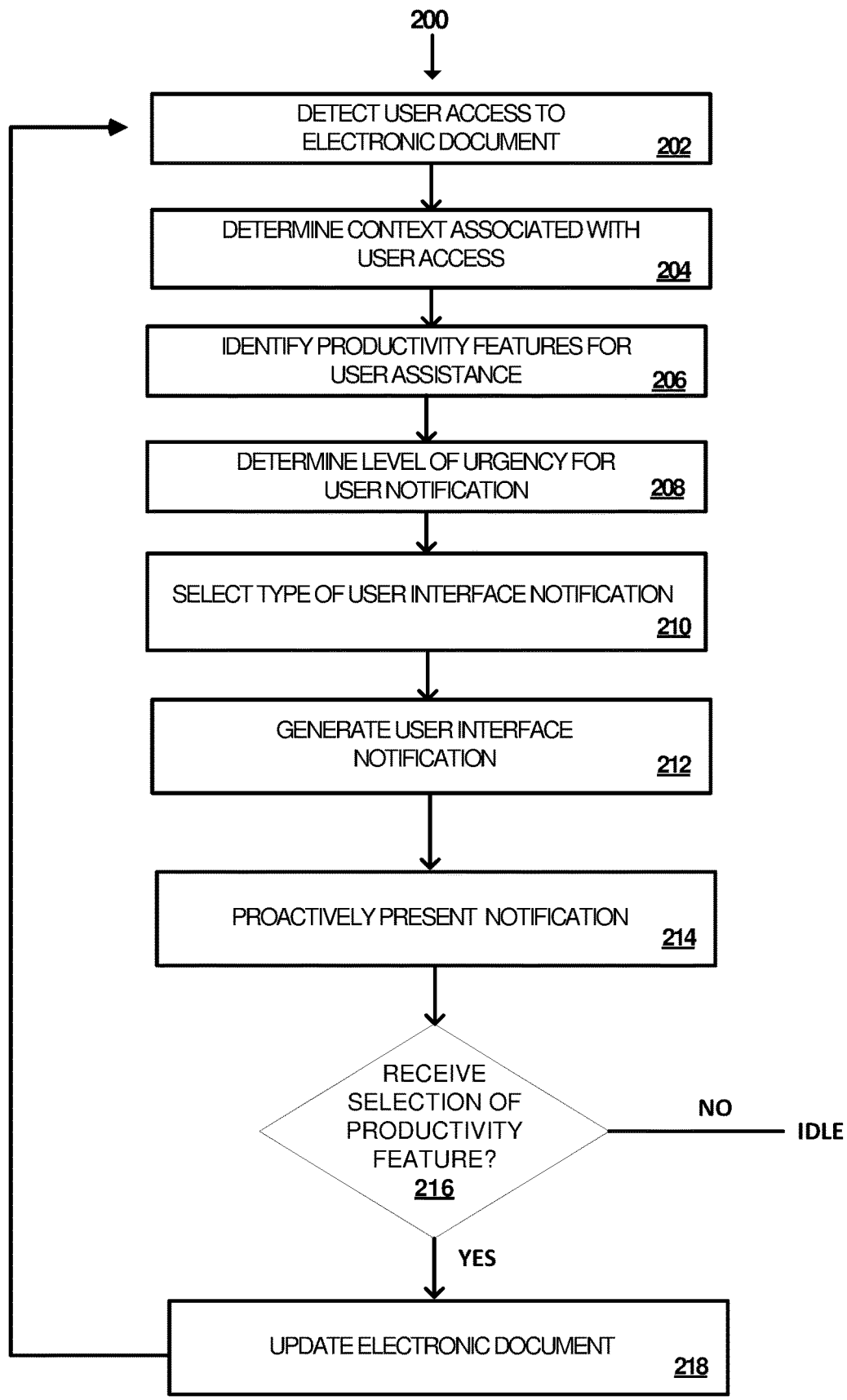

PROACTIVE NOTIFICATION OF RELEVANT FEATURE SUGGESTIONS BASED ON CONTEXTUAL ANALYSIS

CROSS-REFERENCE TO RELATED APPLICATIONS

This application claims priority to U.S. Provisional Patent Application No. 62/734,761, entitled "PROACTIVE NOTIFICATION OF RELEVANT FEATURE SUGGESTIONS BASED ON CONTEXTUAL ANALYSIS", filed on Sep. 21, 2018, which is incorporated by reference herein in its entirety.

BACKGROUND

Application platform suites such as Office365® provide access to a variety of different applications/services. Users may not be aware of all the features available to assist the user with execution of its tasks. Mainly, this is because traditional user interfaces are not configured to evaluate an operational context when determining applicability of tools and features for user assistance. In examples where user interfaces are configured to provide notifications, the notifications may be untimely and interrupt the user from task completion. Again, such notifications may not reflect an operational context, which ultimately hinders user efficiency and creates a frustrating user interface experience.

In many cases, users are utilizing numerous applications/services for document creation and modification requiring a computing device to utilize a large amount of computing resources to manage execution of numerous applications/services as well as the corresponding processing operations. This is inefficient for an executing computing device as well as network resources that are used to access data for various applications/services. In addition to tying up computing resources, cross-application usage can prove tedious and inefficient, where users may continuously have to switch between applications/services to access and/or utilize application-specific content.

SUMMARY

In view of the foregoing technical challenges, the present disclosure relates to processing operations configured to provide proactive notifications of productivity feature suggestions based on predictive relevance to a context associate with user access to an electronic document. A context of user access to an electronic document may be evaluated, where machine learning modeling may utilize the contextual evaluation to predictively determine relevance of a suggestion that relates to: 1) a confidence in the quality of the suggestion; and 2) a timing prediction as to the urgency for surfacing the suggestion to the user so that the suggestion is most applicable. Example notifications are proactively and timely provided so that the notifications may aid processing efficiency in task execution as well as an improve user interface experience. A manner in which the notification is presented may vary based on the confidence in the relevance of the suggestion and timing relevance for interrupting a user's workflow.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 2 illustrates an exemplary method related to proactive notification of suggested productivity features to assist with user workflow processing, with which aspects of the present disclosure may be practiced.

DETAILED DESCRIPTION

Figure 1:
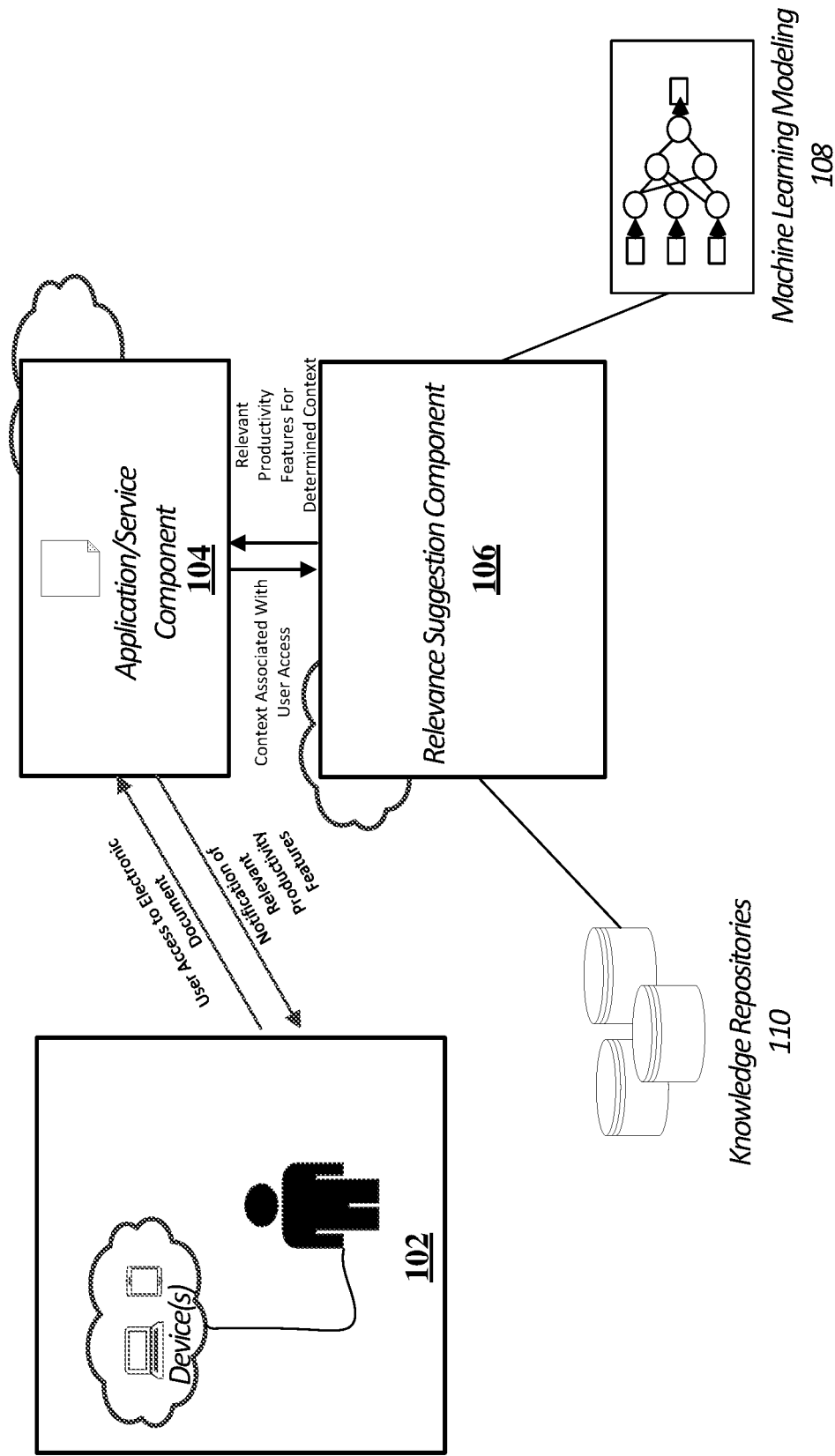
FIG. 1 illustrates an exemplary process flow providing exemplary components for contextual relevance processing as described herein, with which aspects of the present disclosure may be practiced.

The present disclosure relates to processing operations configured to provide proactive notification of productivity feature suggestions based on predictive relevance to a context associate with user access to an electronic document. A context of user access to an electronic document may be evaluated, where machine learning modeling may utilize the contextual evaluation to predictively determine relevance of a suggestion that relates to: 1) a confidence in the quality of the suggestion; and 2) a timing prediction as to the urgency for surfacing the suggestion to the user so that the suggestion is most applicable. Example notifications are proactively and timely provided so that the notifications may aid processing efficiency in task execution as well as an improve user interface experience. A manner in which the notification is presented may vary based on the confidence in the relevance of the suggestion and timing relevance for interrupting a user's workflow.

In examples described herein, a type of notification of a productivity feature suggestion may vary based on the confidence level that a productivity feature is relevant to a user's current task. If the user is no longer performing that specific task, the window of relevance of a suggestion may have closed as the value of the suggestion may be lost. Applications/services commonly interrupt users with notifications that are not relevant to the task they are currently performing. This is a common frustration for users and lessens production efficiency of the user as well as operational efficiency of applications/services.

As such, examples described herein may selectively generate notifications based on the context of the user access, where a level of confidence of relevance and a determination as to a level of urgency for interrupting a user impact the type of notification that is to be proactively presented. Non-limiting examples of types of notifications comprise but are not limited to: badge icon notifications (e.g., application command control user interface features); user interface callouts of varying sizes and amounts of data; direct insertion of a suggestion into an electronic document that is being accessed; generation of customized listings of suggestions that are presented through a user interface pane of an application/service; and notifications surfaced through different modalities (e.g., email, messaging, chat, audio, video) other than a user interface by which an electronic document is being accessed, among other examples.

Consider an example where a user in modifying a layout of content on a slide of a slide-based presentation document but struggling with placement of specific portions of content on the slide. Contextual evaluation of user access to that slide-based presentation may be utilized to identify that the user is editing a slide layout, where a productivity feature for slide layout configuration may be proactively surfaced for the user with one or more previews of how to best organize the content for a given slide. This may save the user time as well as more efficiently update the layout of the slide.

In one non-limiting example, a notification is presented through a user interface of an application/service. For instance, a user interface may be adapted to surface a ranked listing of productivity features in order of relevance to a user's current task. In one such example, a user interface of an application/service may be adapted to surface a specific user interface pane for proactive presentation of productivity feature suggestions. However, in alternative examples, notification of ranked productivity features may also be presented through different modalities (e.g., email, messaging, chat, audio, video) other than a user interface of an application/service that is being utilized to access an electronic document. In further examples, proactive notifications may extend to any of the types of notifications identified in the foregoing description including application command control notifications.

Real-time (or near real-time) processing enables application/services to continuously provide tailored user experiences, where user interfaces may be adapted to reflect a context that a specific user is working with. Processing device views that illustrate non-limiting user interface examples of the present disclosure are provided in FIGS. 3A-3D. Such processing device views provide visual examples of how a user interface is adapted and improved over traditional user interfaces that are not configured to intelligently rank and present productivity feature suggestions or tailored proactive notifications.

Exemplary technical advantages provided by processing described in the present disclosure comprise but are not limited to: proactive notification generation and presentation; generation and application of predictive confidence levels for relevance ranking of productivity features and notification management; generation and application of predictive levels of urgency for managing presentation of notifications; selectively modifying a type of notification based on contextual evaluation of user access to an electronic document; enhancement of processing efficiency during digital document creation and editing in real-time (or near real-time); improved processing efficiency (e.g., reduction in processing cycles, saving resources/bandwidth) for computing devices at the time of user access to an electronic document and during notification generation; adapting and improving front-end user interfaces that are utilized for access to and creation/modification of electronic documents; generation and curation of contextually relevant suggestions of productivity features for different across different contexts; extensibility to tailor processing operations described herein across a plurality of different applications/services; reduction in latency in implementing contextually relevant productivity features to assist with electronic document creation/modification as well as notification generation; and improving usability of applications/services, among other technical advantages.

FIG. 1 illustrates an exemplary process flow 100 providing exemplary components for contextual relevance processing as described herein, with which aspects of the present disclosure may be practiced. As an example, components of process flow 100 may be executed by an exemplary computing system (or computing systems) as described in the description of FIG. 4. Exemplary components, described in process flow 100, may be hardware and/or software components, which are programmed to execute processing operations described herein. In one example, components of process flow 100 may each be one or more computing devices associated with execution of a specific service. Exemplary services may be managed by an application platform that also provides, to a component, access to and knowledge of other components that are associated with applications/services. In one instance, processing operations described in process flow 100 may be implemented by one or more components connected over a distributed network. Operations performed in process flow 100 may correspond to operations executed by a system and/or service that execute computer programs, application programming interfaces (APIs), neural networks or machine-learning processing, language understanding processing, search and filtering processing, and generation of content for presentation through a user interface of an application/service, among other examples. In the illustration of process flow 100, there are process flow steps that are aimed at emphasizing non-limiting examples of interaction between components shown in FIG. 1. Process flow between components may be altered without departing from the spirit of the present disclosure.

Process flow 100 comprises user computing device(s) 102 (e.g., client computing device). An example of a user computing device 102 is a computing system (or computing systems) as described in the description of FIG. 4. A user may interact with an exemplary application/service through the user computing device(s) 102. For instance, the user may connect to an application/service through any number of different device modalities. In some examples, a user may connect to an application/service (e.g., a productivity application/service that is utilized to create or modify an electronic document) through different user computing devices 102, where non-limiting examples of such are: a smart phone, a laptop, a tablet, a desktop computer, etc. In other instances, a user may carry on a multi-modal communication with an application/service via multiple user computing devices.

A user may be accessing, through interfacing between a computing device 102 and an application/service component 104, one or more application/services that are used to execute any type of task including document creation and/or modification. An application/service that the user is accessing is configured to provide a user interface or graphical user interface (GUI) that enables access to and creation/modification of electronic documents. An example user interface may be adapted to provide functionality described herein where user interface features and application command control is achieved to foster improved creation of electronic documents through new user interface features that are not present in traditional user interface systems. For instance, signal data related to user interaction with an application/service, past interactions with applications/services by the user and/or other users, may be utilized to tailor proactive notifications and suggestions provided through a user interface. New user interface menus may be presented to a user that include suggestions of contextually relevant productivity features at a determined reference point in a lifecycle of the electronic document. Processing device views that illustrate non-limiting user interface examples of the present disclosure are provided in FIGS. 3A-3D.

An electronic document (or electronic file) is a representation of content in an electronic media/electronic format such as a digital file. Examples of electronic documents may vary where files may be created to work with any type of application/service and in any type of file format as known to one skilled in the field of art. For instance, an electronic document may be created for a word processing service, notetaking service, slide-based presentation service, etc., where the electronic document may comprise authored content. Electronic documents may be accessed natively, through applications stored on the user computing device. In alternate examples, electronic documents may be accessed over a network connection such as in the following non-limiting examples: an electronic document is a web page accessed through a web browser; and an electronic document a distributed copy of a file that is being accessed but is remotely stored on a data storage (e.g., distributed data storage) other than the computing device 102 that is being used to access content.

As referenced above, exemplary applications/services may interface with other components of process flow 100 to enhance processing efficiency and functionality as described herein. The application/service component 104 is configured to interface with other components of process flow 100 including computing device(s) 102 and the relevance suggestion component 106. Applications/services may be any type of programmed software. An exemplary application/service is a productivity application/service that is configured for execution to enable users to complete tasks on a computing device, where exemplary productivity services may be configured for access to and creation of content including electronic documents. Examples of productivity services comprise but are not limited to: word processing applications/services, spreadsheet applications/services, notes/notetaking applications/services, authoring applications/services, digital presentation applications/services, search engine applications/services, email applications/services, messaging applications/services, web browsing applications/services, collaborative team applications/services, digital assistant applications/services, webpage building applications/service, directory applications/services, mapping services, calendaring services, electronic payment services, digital data storage or distributed data storage applications/services, web conferencing applications/services, call communication applications/services, language understanding applications/services, bot framework applications/services, networking applications/service, and social networking applications/services, among other examples. In some examples, an exemplary productivity application/service may be a component of an application platform providing a suite of productivity applications/services. An application platform suite is configured to providing access to a plurality of applications/services, thereby enabling cross-application/service usage to enhance functionality of a specific application/service at run-time. As productivity features may span a wide variety of functionality, contextual relevance evaluation is configured to identify specific productivity features that are most relevant to a context in which a user is accessing an electronic document. Moreover, specific application/services as well as application platform suites may be configured to interface with other non-pro-prietary application/services (e.g., third-party applications/services) to extend functionality including productivity feature suggestion and implementation.

As referenced in the foregoing, the application/service component 104 is configured to interface with the relevance suggestion component 106. In doing so, signal data may be collected by either: the application/service component 104; or the relevance suggestion component 106 via the application/service component 104, to enable contextual processing for user access to an electronic document. Signal data may then be evaluated, where evaluation of the signal data yields generation of insights that are used for identifying most relevant productivity features for a given context and generating proactive notifications that comprise suggestions of productivity features. Productivity features comprise features and tools for task execution that are accessible by a specific application/service or an application platform suite (e.g., Microsoft® Office®; Office365®). An application platform suite is configured to providing access to a plurality of applications/services, thereby enabling cross-application/service usage to enhance functionality of a specific application/service at run-time. As productivity features may span a wide variety of functionality, contextual relevance evaluation is configured to identify specific productivity features that are most relevant to a context in which a user is accessing an electronic document. That is, contextual relevance of productivity feature suggestions may vary as a context associated with user access changes. For instance, users may access different application/services to work with specific types of electronic documents, the type of user access (e.g., viewer versus author) may vary, user access patterns may vary for a given context (e.g., a user may have a history of working with specific types of documents but not others), etc.

Signal data that may be collected and evaluated may comprise any of: computing device-specific signal data; application/service-specific signal data; user-specific signal data and a combination thereof. Specific non-limiting examples of such types of signal data comprise but are not limited to: signal data used for classifying a user and/or type of user access; signal data related to user application/service usage and user actions; signal data related to content of an electronic document (including formatting/layout of content); signal data related to a lifecycle of an electronic document; signal data related to collaborative usage; and signal data collected from other users of a specific application/service or an application platform suite, among other examples.

In one example, the relevance suggestion component 106 is configured to evaluate signal data usable to classify a type of user access to an electronic document. Classification of a type of user access may be useful in curating productivity features to identify what productivity features are most relevant to the user at the current time that the user is accessing an electronic document. For instance, signal data may be collected and correlated to determine whether a user is a viewer or an author of the electronic document. In examples where the user is an author, who may be actively creating/editing an electronic document, productivity features related to content modification may be more useful to the user than productivity that offer more passive assistance (e.g., whether the electronic document should be shared with other users). As an example, determination as to whether a user is a viewer or author of an electronic document may be further based on signal data that indicates user activity with respect to an electronic document, among other types of signal data. Examples of types of signal data that may indicate user action with respect to an electronic document that may be collected comprise but are not limited to: determining whether the user is actively editing an electronic document (including evaluation of specific types of actions); determining a type of mode (e.g., read-only, editable) that the electronic document is in; identifying tasks/reminders associated with the user; and detecting idle time between received user actions, among other examples. Further, signal data related to what computing device is being utilized to access an electronic document may be obtained and analyzed. In some cases, certain productivity features may be more relevant for one modality (e.g., mobile phone or tablet) as compared with another type of modality (e.g., desktop computer, smart watch).

Moreover, the relevance suggestion component 106 is configured to evaluate signal data usable to determine a reference point in a lifecycle of the electronic document. User access may correspond to different points in a lifecycle of the electronic document where different productivity features may be more relevant at the beginning of document creation as opposed to the end of the document creation. For example, say the user is just initiating creation a slide-based presentation and is adding content. A productivity feature for design and layout of the content may be useful to help the user, who is authoring the slide-based presentation, generate a best representation of the content. For comparison sake, say the user has created a slide-based presentation with a plurality of slides and is at the point of reviewing the slide-based presentation for actual presentation. In such a case, the user may not be a viewer of presentation document rather than an active editor. Productivity features for sentence structure tips (e.g., active voice versus passive voice) or setting reminders (e.g., meeting, time of presentation), among other examples, may be more useful to the user. A reference point, as described herein, may be determined based on collection of a number of different types of signal data including but not limited to: analysis of timestamps data for a creation date of an electronic document relative to current timestamp data; signal data indicating an amount of access to the electronic document by a user (or group of users); signal data indicating comments and/or tasks/reminders that are outstanding; evaluation of metadata associated with electronic document indicating finality of electronic document (e.g., file name, indication of keywords such as "draft", "final", etc.); determining a type of mode (e.g., read-only, editable) that the electronic document is in; and evaluating user usage data/user behaviors (e.g., of the specific user and/or other users) related to similar document types, among other examples.

Furthermore, the relevance suggestion component 106 is configured to evaluate signal data usable to determine a level of user engagement with one or more productivity features based on past actions or past behaviors taken by the user and/or other users. As an example, the relevance suggestion component 106 may be configured to interface with knowledge repositories 110 that provide access to log data and/or telemetric data indicating user engagement in specific contextual scenarios. Such data may be mined and applied to identify what productivity features may be most relevant to the user. For instance, a user may prefer to use certain types of productivity features and ignore other types of productivity features. In further examples, signal data for user engagement may further identify whether notifications for specific productivity features have been presented to the user and how frequently such notifications have been presented. User behaviors indicating interactions with such notifications may further be useful in identification of relevant productivity features. In any example, user signal data is collected and analyzed in accordance with privacy laws and regulations and may also require user content to have such data collected and analyzed (potentially including opt-in and/or opt-out clauses in consent).

In evaluating context of user access, the relevance suggestion component 106 is further configured to evaluate signal data usable to identify content associated with the electronic document and formatting associated with the content. For example, content and metadata associated with an electronic document may be parsed and evaluated, which may enable insights to be generated such as: how formatting/layout of content can be arranged/re-arranged; where content may be modified (e.g., added; removed); whether a form of the content may be improved/modified (e.g., rich data object added instead of a static data object); version identification of an electronic document; and whether a user has accessed and/or edited an electronic document, among other examples.

Other types of signal data evaluated to understand a context associated with user access may comprise signal data usable to identify one or more of tasks and reminders that are associated with the electronic document. Identification of tasks and reminders may be useful in identifying relevant productivity features that may help resolve outstanding tasks and/or dovetail with reminders for task execution.

In some examples, signal data related to a classification of the user may be utilized to aid contextual determination related to user access. For instance, profile data associated with a user account may be utilized to indicate: user preferences; badges and/or achievements; job titles/rank in an organization, group, team, etc.; and social network connections, among other examples. Such signal data may further be useful to classify user preferences relative to other users of an application/service and/or application platform suite. In further examples, collaborative access to an electronic document by the user and/or other user accounts may be further utilized to predict user preferences for receiving insights related to specific productivity features.

Machine learning modeling 108 is applied by the relevance suggestion component 106 for processing operation steps comprising: evaluation of signal data associated with an instance of user access to an electronic document; generating of insights from the evaluation of the signal data; identification of productivity features; relevance ranking of the identified productivity features; selection of a type of proactive notification for identification of productivity feature suggestions; and generating of proactive notifications identifying productivity feature suggestions. Creation, training and update of a machine learning modeling 108 is known to one skilled in the field of art. In examples of the present disclosure, known examples of machine learning modeling are adapted to generate and expose an intelligent learning model for execution of the processing operations described herein. In doing so, the intelligent learning model is created, trained and implemented, to correlate productivity features with insights generated based on evaluation of collected signal data. For example, one or more layers of abstraction may be applied during the machine learning modeling 108, where the one or more layers of abstraction correlate specific signal data with productivity features.

To gain access to data needed for execution of the machine learning modeling 108, the relevance suggestion component 106 interfaces with a plurality of knowledge repositories 110. Knowledge repositories 110 may comprise knowledge data that is used to execute any processing operations for the relevance suggestion component 106. Knowledge repositories 110 may be accessed to obtain data for generation, training and implementation of machine learning modeling 108. Knowledge resources comprise any data affiliated with an application platform (e.g., Microsoft®, Google®, Apple®, IBM®) as well as data that is obtained through interfacing with resources over a network connection including third-party applications/services.

A ranker may be trained and employed by the machine learning modeling 108. The ranker is configured to score the correlation between the context associated with the user access and the functionality of specific productivity features. Ranking processing, ranking methodologies (including classification and regression analysis) and implementation of an exemplary ranker is known to one skilled in the field of art. The machine learning modeling 108 may be trained to generate predictive confidence score as to how relevant a specific productivity feature correlates with a determined context. Predictive confidence scores associated with specific productivity features may be utilized to rank/prioritize an order in which productivity feature suggestions are provided to a user. In further examples, developers may implement weighting to emphasize priority of specific insights over other insights, where developers can assign different weights to different insights to tailor ranking processing. Rankings associated with productivity features enables the machine learning modeling 108 to select specific productivity features for presentation at specific times. For example, one or more highest ranked of productivity features may be selected for presentation to a user based on the determined context associated with the user access.

Moreover, the relevance suggestion component 106 may be further configured to execute machine learning modeling 108 for the generation of productivity feature suggestions based on the ranking of the productivity features and the determined context associated with the user access for the electronic document. For instance, suggestions for task execution and improving user workflow, which are most relevant to the determined context, are generated on behalf of the user. This may comprise but is not limited to: suggestions for modification of electronic documents, task execution corresponding with the electronic document (e.g., sharing/collaboration, adding comments, reminders, setting meetings); educational and learning insights; automation of action(s) on behalf of a user; recommendations of new/ undiscovered features; and telemetry analytics, among other examples. In other examples, processing for generation of contextually relevant productivity feature suggestions may be executed by the relevance suggestion component 106, the application/service component 104 or a combination thereof.

The relevance suggestion component 106 is further configured to manage generation of proactive notifications of productivity features suggestions. For example, machine learning modeling 108 executes processing operations to predictively determine relevance of a suggestion that relates to: 1) a confidence in the quality of the suggestion; and 2) a timing prediction as to the urgency for surfacing the suggestion to the user so that the suggestion is most applicable. The relevance suggestion component 106 may selectively generate notifications based on the context of the user access, where a level of confidence of relevance and a determination as to a level of urgency for interrupting a user impact the type of notification that is to be proactively presented. Non-limiting examples of types of notifications comprise but are not limited to: badge icon notifications (e.g., application command control user interface features); user interface callouts of varying sizes and amounts of data; direct insertion of a suggestion into an electronic document that is being accessed; generation of customized listings of suggestions that are presented through a user interface pane of an application/service; and notifications surfaced through different modalities (e.g., email, messaging, chat, audio, video) other than a user interface by which an electronic document is being accessed, among other examples.

Machine learning modeling 108 may generate predictive confidence scoring for a relevance of a productivity feature to assist with a current reference point in a user workflow. As a non-limiting example, thresholds may be set for predictive confidence levels, which may be utilized to assist with selecting a type of notification to present to a user. Signal data that is usable for generation of predictive confidence scoring as to the relevance of a productivity feature is described in the foregoing description.

Thresholds may also be set for determination as to a level of urgency of notification. Levels of urgency of notification may be set to correlate detected signals data with a timing prediction as to when a notification is most relevant to a user. For example, signal data related to a lifecycle of an electronic document (e.g., whether the user is just creating the electronic document, whether the user is reviewing a created electronic document, whether the electronic document is finalized) may provide insight into how urgent a notification may be to a user. Other types of signal data that may be useful for determining a level of urgency comprise but are not limited to; signal data related to what the user is currently working on; and signal data related to user patterns or past behaviors including interactions with specific productivity features, among other examples.

Thresholds may be set by developers and may vary without departing from the spirit of the present disclosure. While any type of notification may be proactively surfaced for a user, the amount of attention drawn by the type of notification is considered herein. Non-limiting examples of types of notifications comprise but are not limited to: badge icon notifications (e.g., application command control user interface features); user interface callouts of varying sizes and amounts of data; direct insertion of a suggestion into an electronic document that is being accessed; generation of customized listings of suggestions that are presented through a user interface pane of an application/service; and notifications surfaced through different modalities (e.g., email, messaging, chat, audio, video) other than a user interface by which an electronic document is being accessed, among other examples.

Confidence levels for relevance of suggestions and/or a determination as to the urgency may impact the determination as to the specific type of notification to present to a user. For example, a moderate confidence level (e.g., below a threshold value) may result in a user interface badge icon (e.g., on a user interface feature of an application command control) to be selected as a type of notification. A high confidence level (e.g., satisfying a threshold value) may result in display of a callout notification that draws more attention to the notification by overlapping an electronic document. The higher the level of confidence in the relevance of the productivity feature suggestion and/or the higher level of urgency of notification, the greater the amount of user attention that an application/service may wish to draw from the user.

In further examples, evaluation of signal data may play into a selected type of notification and/or a method of delivery of a notification. For instance, a user may be editing an electronic document through a word processing application/service that is executing on its laptop device while contextual signal data also indicates that the user is actively engaged in a messaging application/service dialogue on their mobile phone. Contextual evaluation may indicate that the user is more preoccupied with its phone, and thus send a notification as a text message to the mobile phone.

In some examples, the relevance suggestion component 106 may generate a proactive notification for a productivity feature suggestion. In other examples, the relevance suggestion component 106 may propagate data to the application/service component 104 for generation of the proactive notification usable to present a suggested productivity feature to a user. In any case, processing operations for generation of a proactive notification comprise but are not limited to: determining a context associated with user access to the electronic document; determining a level of urgency of notification based on the determined context and an identification of the productivity feature; and selecting a type of user interface notification based on the determined level of urgency.

The application/service component 104 is configured to proactively present a notification for user provision identifying one or more ranked productivity features. In one example, the application/service component 104 presents the notification through the user interface of an application/service in which the user is accessing the electronic document. For instance, a proactive notification is presented through a user interface feature of an application command control for an application/service. In another instance, a user interface may be adapted to surface a ranked listing of productivity features in order of relevance to a user's current task. In one such example, a user interface of an application/service may be adapted to surface a specific user interface pane that is tailored for the presentation of productivity feature suggestions. Alternatively, the proactive notification may be surfaced directly within an electronic document and/or overlapping at least a portion of the electronic document.

In further examples, the machine learning modeling 108 may be trained to evaluate other types of factors in determining how to present productivity feature suggestions. Examples of such factors include but are not limited to: the modality by which the user is accessing an application/service; available display space within an application/service based on the usage by the user; and threshold levels of ranking (e.g., a number of ranked suggestions that meet a threshold level of relevance), among other examples. In examples, where the application/service component 104 generates the proactive notifications, the relevance suggestion component 106 may interface with the application/service component 104 to communicate data that may guide presentation of a proactive notification.

In alternative examples, notification of ranked productivity features may also be presented through other applications/services. For example, contextual evaluation may determine that a notification is best suited to be provided to the user through a different modality (e.g., email, messaging, chat, audio, video) other than a user interface of an application/service that is being utilized to access an electronic document. In such an instance, the relevance suggestion component 106 may direct the application/service component 104 to utilize another application/service to present/surface the notification through a selected modality.

The application/service component 104 is configured to interface with the computing device(s) 102 to present the notification of the productivity feature suggestion(s). For example, a computing device 102, accessing an application/service executing thereon, may present the notification through its user interface. The user may interact with the notification. For example, the user may select, through the user interface, a user interface features that triggers update to the electronic document based on a suggestion associated with the productivity feature. In such an example, the electronic document may be updated based on the selection.

Processing operations of the relevance suggestion component 106 may be written into the coding of an application/service, where an application/service may be adapted to implement functionality described in the present disclosure. In another example, processing by the relevance suggestion component 106 may be may be executed by a stand-alone application/service that is configured to interface with the application/service component 104 to provide customized application experiences. For example, an application/service for management of productivity feature suggestions may interface with an application platform providing a suite of productivity applications/services, where productivity feature suggestions can be tailored to the specific context of a user workflow.

FIG. 2 illustrates an exemplary method 200 related to proactive notification of suggested productivity features to assist with user workflow processing, with which aspects of the present disclosure may be practiced. Processing operations described in method 200 may be executed by components described in process flow 100 (FIG. 1), where the detailed description in process flow 100 supports and supplements the recited processing operations in method 200. Interfacing and communication between exemplary components, such as those described in process flow 100, are known to one skilled in the field of art. For example, data requests and responses may be transmitted between applications/services to enable specific applications/services to process data retrieved from other applications/services. Formatting for such communication may vary according to programmed protocols implemented by developers without departing from the spirit of this disclosure.

Figure 4:
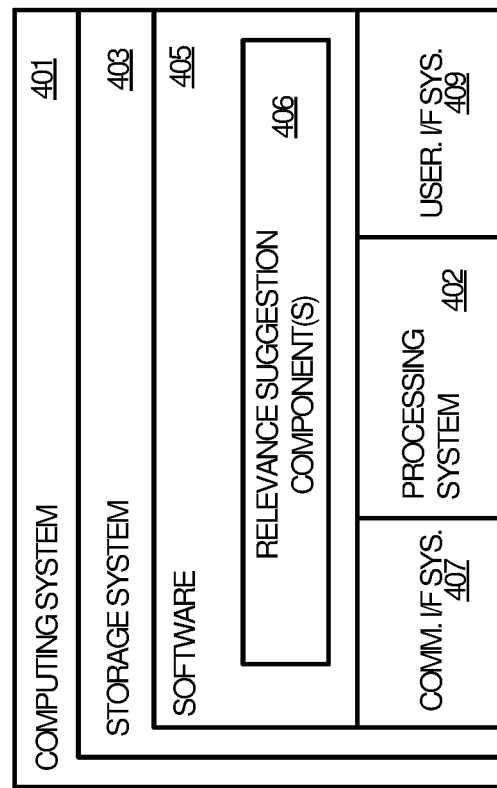
FIG. 4 illustrates a computing system suitable for implementing processing operations described herein related to contextual relevance processing, with which aspects of the present disclosure may be practiced.

As an example, method 200 may be executed across an exemplary computing system (or computing systems) as described in the description of FIG. 4. Exemplary components, described in method 200, may be hardware and/or software components, which are programmed to execute processing operations described herein. Operations performed in method 200 may correspond to operations executed by a system and/or service that execute computer programs, software agents, intelligent bots, application programming interfaces (APIs), neural networks and/or machine-learning processing, among other examples. In some examples, processing operations described in method 200 may be executed by one or more applications/services associated with a web service that has access to a plurality of application/services, devices, knowledge resources, etc. In one instance, processing operations described in method 200 may be implemented by one or more components connected over a distributed network.

Method 200 begins at processing operation 202, where user access to an electronic document is detected. As an example, user access to an electronic document may be detected based on interaction between a user computing device and an application/service that is utilized to work with the electronic document. Examples of electronic documents and user access to electronic documents has been described in the foregoing description including the description of process flow 100 (FIG. 1).

Flow of method 200 may proceed to processing operation 204, where a context associated with the use access to the electronic document is determined. As an example, processing operation 204 comprises collecting and evaluating signal data associated with the user access. Evaluation of signal data for determination of context has been described in the foregoing description including the description of process flow 100 (FIG. 1), for example, where a relevance suggestion component 106 executes processing for contextual determination of user access through machine learning modeling. As an example, processing operation 204 comprises evaluation of signal data for classifying a type of user access to the electronic document and determining a reference point in a lifecycle of the electronic document. Other non-limiting examples of signal data evaluation, for determination of a context associated with the user access, comprises but is no limited to: identifying content associated with the electronic document and formatting associated with the content; determining a level of user engagement with one or more productivity features based on past actions taken by the user and/or other users; identifying one or more of tasks and reminders that are associated with the electronic document; and evaluating collaborative access to the electronic document by the user and other users of an application/service (or platform application), among other examples.

At processing operation 206, productivity features for user assistance are identified. Productivity features have been described in the foregoing description. Identification of productivity features has been described in the foregoing description including the description of process flow 100 (FIG. 1), for example, where a relevance suggestion component 106 executes identification of productivity features through machine learning modeling (e.g., implementation of an intelligent learning model). As an example, identified productivity features are associated with a productivity application or service that presents the electronic document. However, examples are not so limited and productivity features may be associated with any application/service that is programmed to interface with the application/service (or application platform) which is used to access the electronic document. Processing operation 206 may further comprise determining, based on the determined context, a level of confidence that the productivity feature is relevant to the electronic document. In addition to identifying relevant productivity features for suggestions, predictive confidence levels may also be utilized to assist with selection of a type of proactive notification.

Flow of method 200 may proceed to processing operation 208, where a level of urgency of notification is determined. As identified in the foregoing description, determination of a level of urgency of notification is an insight used for the tailoring of a proactive notification to a specific context associated with an electronic document. Processing 208 comprises determining a level of urgency based on the determined context and an identification of the productivity feature. In further examples, the level of urgency is further determined based on the determined level of confidence. Processing operations for determination of a level or urgency may be occur through machine learning modeling as implemented by the relevance suggestion component 106 (FIG. 1).

At processing operation 210, a type of user interface notification is selected for proactive presentation. Processing operation 210 comprises selecting, from a plurality of types of proactive notifications, a type of user interface notification based on the determined level of urgency and/or the predicted confidence level identifying relevance of productivity features. Examples of notification types have been provided in the foregoing description as well as threshold evaluation used in some examples to select a type of user interface notification. In one non-limiting example, processing operation 210 comprises generating a badge icon notification when the determined level of confidence is below a threshold value. In another non-limiting example, processing operation 210 comprises generating a callout notification that overlaps the electronic document when the determined level of confidence satisfies a threshold value.

Once a type of user interface notification is selected, flow of method 200 proceeds to processing operation 212. At processing operation 212, a proactive user interface notification is generated. Generation of such a notification occurs based on results of the machine learning modeling that factors in the determined context, the identified productivity feature and the selected type of user interface notification.

In processing operation 214, the user interface notification is proactive presented. In one example, processing operation 214 comprises proactively presenting the user interface notification through a user interface of an application/service (e.g., the application/service used to access the electronic document). Further examples of presentation of a user interface notification have been provided in the foregoing description. In one example, processing operation 214 may comprise automatically surfacing the notification without receiving a request for user assistance from a user associated with the user access. That is, the notification may be automatically presented on behalf of the user without requiring the user to request for productivity feature suggestions. In an alternative example, a request for provision of productivity features is received through a user interface associated with a productivity application or service. In such an example, the request acts as a trigger for presentation (processing operation 212) of the notification.

Processing may proceed to decision operation 216, where it is determined whether a selection of suggestion, that is associated with a productivity feature, is received. In examples where a user ignores a productivity feature suggestion and no selection is made, flow of decision operation 216 branches NO and processing of method 200 remains idle until subsequent contextual evaluation takes place. In examples where a selection of a productivity feature suggestion is made, flow of decision operation 216 branches YES and processing of method 200 proceeds to processing operation 216. At processing operation 216, an update to the electronic document occurs based on the selection of the productivity feature suggestion. In such an example, the electronic document may be updated based on the selection.

FIGS. 3A-3D illustrate exemplary processing device views associated with proactive notification of suggest productivity features, with which aspects of the present disclosure may be practiced. Processing operations described in process flow 100 (FIG. 1) and method 200 (FIG. 2) support and supplement back-end processing used for generation of exemplary processing device views shown in FIGS. 3A-3D.

Figure 3A:
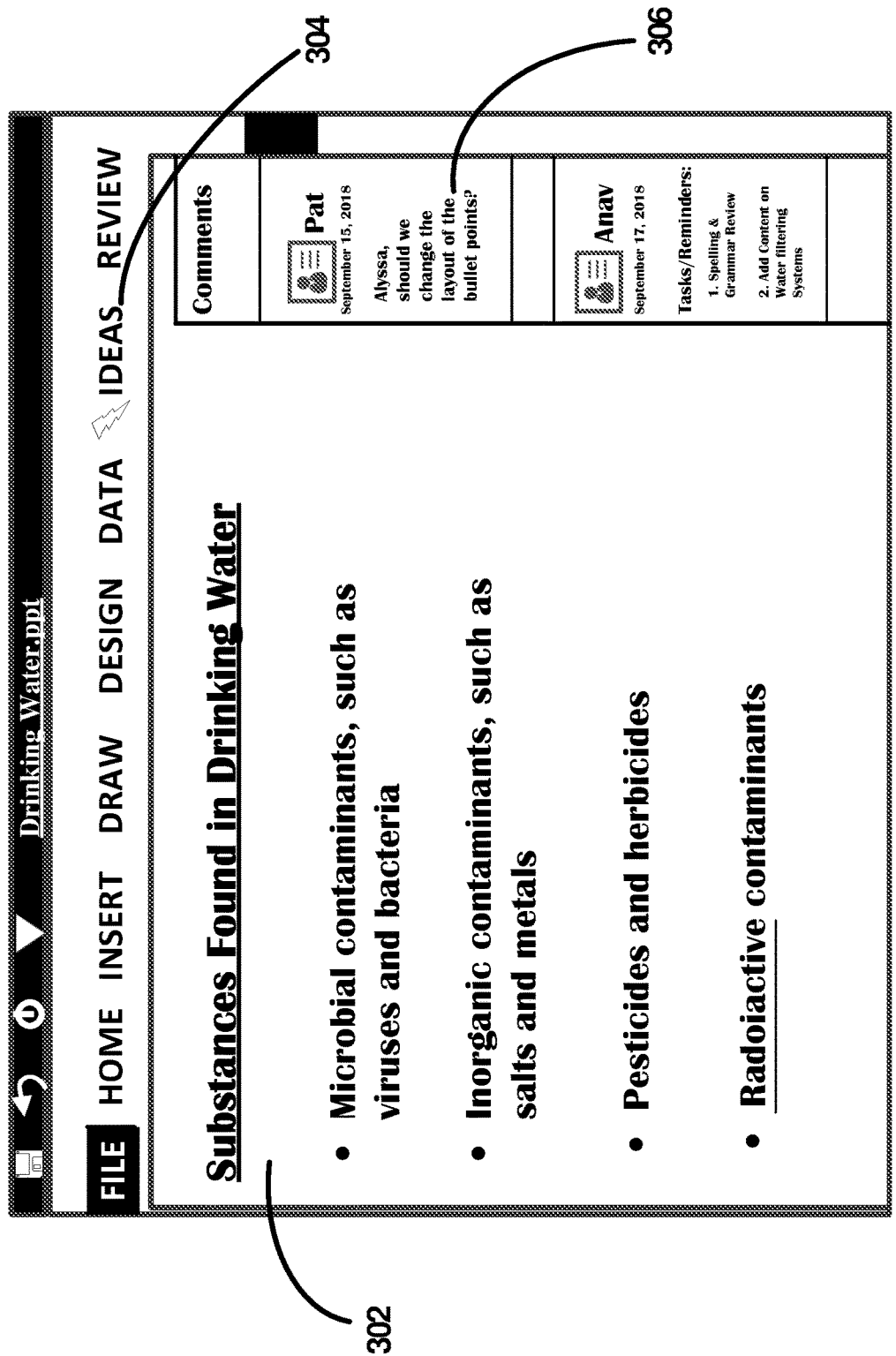
FIGS. 3A-3D illustrate exemplary processing device views associated with proactive notification of suggest productivity features, with which aspects of the present disclosure may be practiced.

FIG. 3A presents processing device view 300, illustrating an interaction with a user, through a user computing device, and an exemplary productivity service. Processing device view 300 illustrates display of an electronic document 302 through a productivity application/service (e.g., slide-based presentation program). In the example shown in processing device view 300, the user is editing a slide in a presentation discussing drinking water. Processing device view 300 further identifies collaborative comments from users that are jointly editing the electronic document (e.g., a shared electronic document). A first collaborative comment 304 raises a question, for users, regarding changing the formatting/layout of the slide shown for the electronic document 302.

A second collaborative comment 306 identifies tasks and reminders, for users, that are required for update of the electronic document 302. In the example shown, the collaborative comments may provide a basis for generation of productivity feature suggestions, where signal data associated with the collaborative comments may be analyzed to determine a current context at the time that the user is accessing the electronic document 302. Moreover, processing device view 300 illustrates a modification to a user interface, where user interface feature 304 ("IDEAS") is presented for management of notifications of productivity features. In the example, shown user interface feature 304 is incorporated into the application command control of the user interface.

Figure 3B:
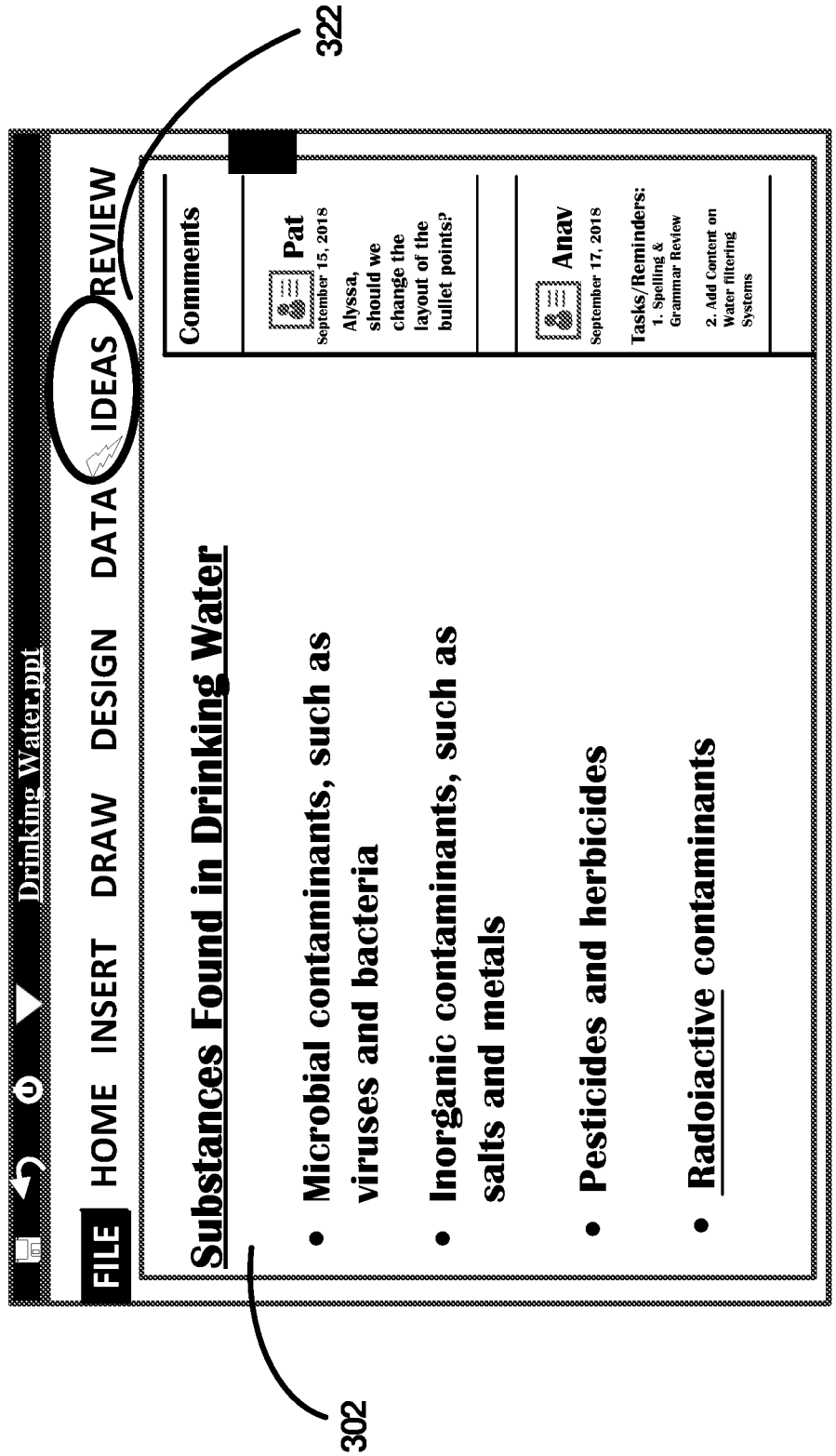

FIG. 3B presents processing device view 320, illustrating a continued example of an adapted user interface that comprises the user interface feature (e.g., user interface feature 304) for management of notifications of productivity features. In the example shown in processing device view 320, a badge icon notification 322 is proactively presented, through the user interface. As indicated in the foregoing description, confidence levels for relevance of suggestions and/or a determination as to the urgency may impact the determination as to the specific type of notification to present to a user. For example, a low confidence level (e.g., below a threshold value) may result in the badge icon notification 322 being proactively presented on behalf of a user, which may draw the user's attention to the badge icon notification 322 but not overwhelm the user if the user is focused on a task. In another instance, processing operations for generation of a proactive notification may have determined that a level of urgency level may be low, indicating that productivity feature suggestions are available but not necessarily tied to the current tasks that the user is executing. If the user wants to select the badge icon notification 322, it can peruse a listing of productivity feature suggestions at its leisure.

Figure 3C:
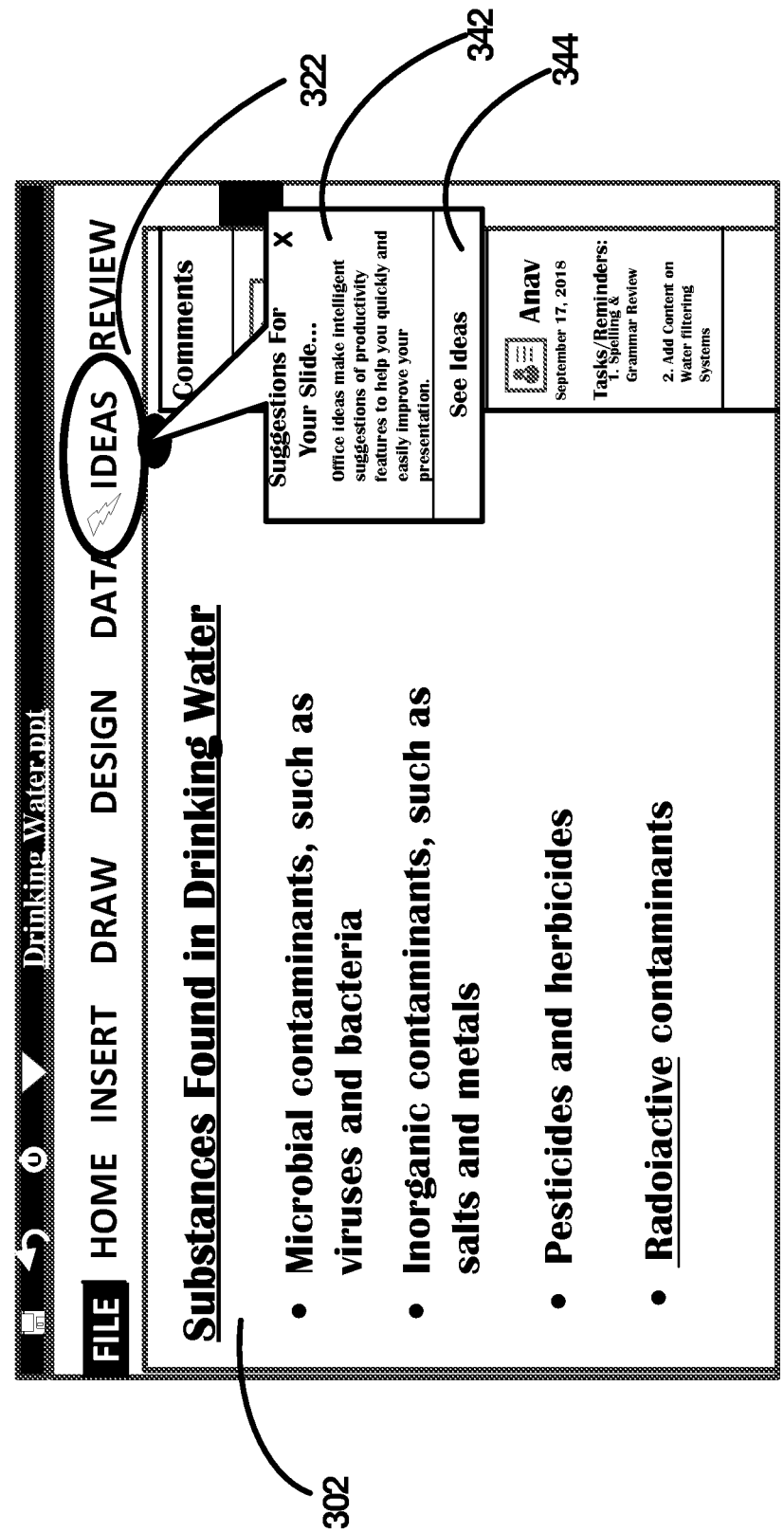

FIG. 3C presents processing device view 340, illustrating another example of an interaction with a user, through a user computing device, and an exemplary productivity service. In one instance, processing device 340 is a continued example, from processing device view 300 (FIG. 3A), where a user interface callout 342 is presented in addition to the badge icon notification 322, drawing more user attention to potential suggestions for update to the electronic document 302. The user interface callout 342 may be configured to generally indicate to the user that there are relevant productivity feature suggestions to enhance user tasks related to update of the electronic document 302. In the example shown, a confidence level in relevance may be moderate, indicating that specific productivity feature suggestions (e.g., for updating slide content) are available but they are not necessarily urgently tied to the task that the user is currently performing. The user interface callout 342 further comprises a user interface link 344 that may assist the user with navigating to a full list of productivity feature suggestions (e.g., ranked productivity feature suggestions).

Figure 3D:
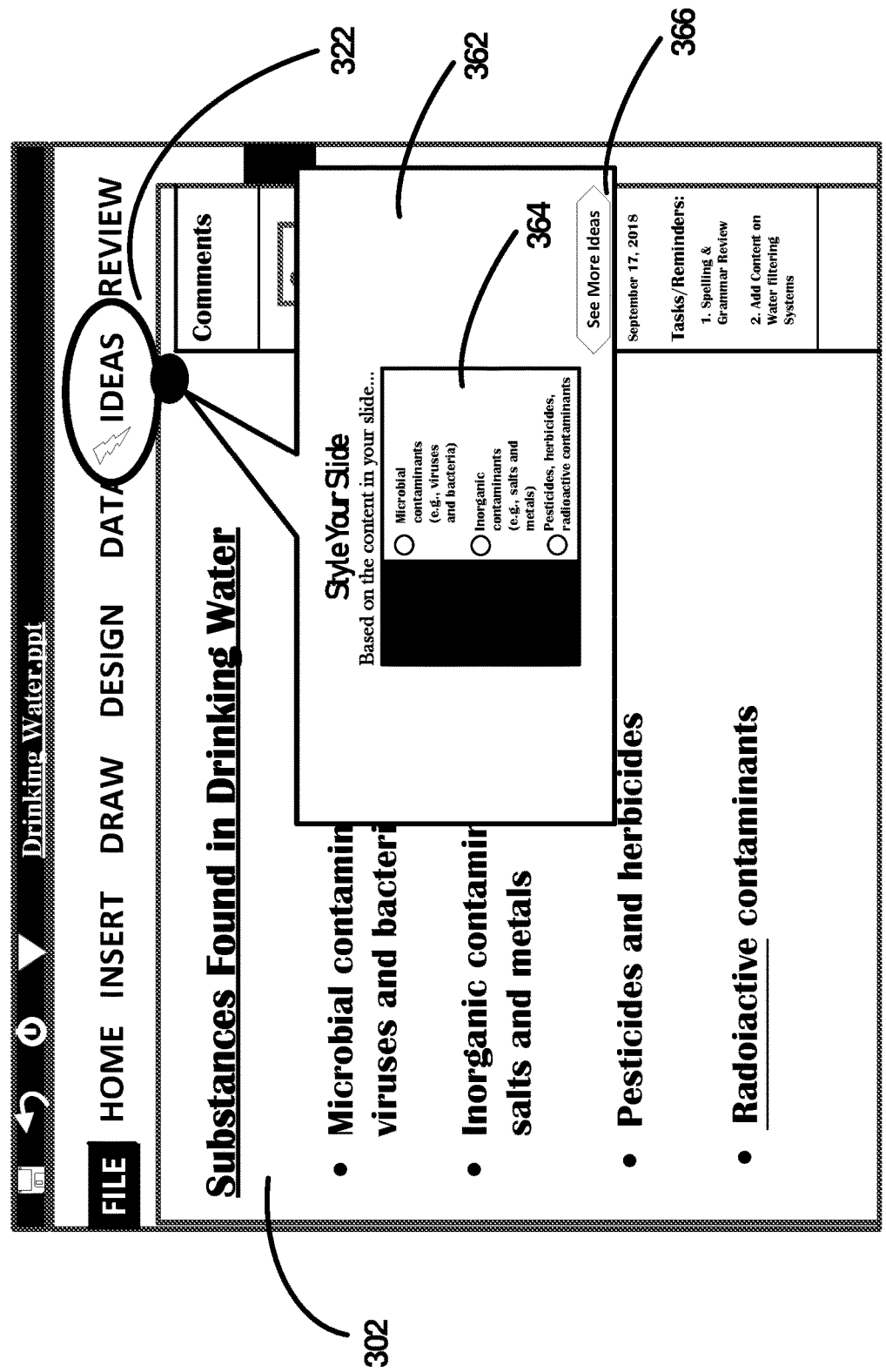

FIG. 3D presents processing device view 360, illustrating another example of an interaction with a user, through a user computing device, and an exemplary productivity service. In one instance, processing device 360 is a continued example, from processing device view 300 (FIG. 3A), where a user interface callout 362 is presented in addition to the badge icon notification 322, drawing more user attention to potential suggestions for update to the electronic document 302. The user interface callout 362 provides indication of a highest ranked productivity feature suggestion 364 (e.g., related to layout/formatting arrangement of slide content), which may be highly relevant to current tasks that the user is performing such as editing formatting of slide content. The highest ranked productivity feature suggestion 364 is presented because contextual evaluation of user access indicates a high confidence level (e.g., satisfying a threshold value) that this specific productivity feature is urgently relevant to the tasks that the user is performing. The user interface callout 362 further comprises a user interface link 366 that may assist the user with navigating to a full list of productivity feature suggestions (e.g., ranked productivity feature suggestions) in addition the highest ranked productivity feature suggestion 364.

FIG. 4 illustrates a computing system 401 suitable for implementing processing operations described herein related to contextual relevance processing, with which aspects of the present disclosure may be practiced. Computing system 401, which is representative of any system or collection of systems in which the various applications, services, scenarios, and processes disclosed herein may be implemented. Examples of computing system 401 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, portable electronic devices, smart televisions, smart watches and other wearable devices, as well as any variation or combination thereof.

Computing system 401 may be implemented as a single apparatus, system, or device or may be implemented in a distributed manner as multiple apparatuses, systems, or devices. For example, computing system 401 may comprise one or more computing devices that execute processing for applications and/or services over a distributed network to enable execution of processing operations described herein over one or more services. Computing system 401 may comprise a collection of devices executing processing for front-end applications/services, back-end applications/service or a combination thereof. Computing system 401 comprises, but is not limited to, processing system 402, storage system 403, software 405, communication interface system 407, and user interface system 409. Processing system 402 is operatively coupled with storage system 403, communication interface system 407, and user interface system 409. Processing system 402 loads and executes software 405 from storage system 403. Software 405 includes one or more software components 406 that are configured as relevance suggestion component(s) executing processing operations as described herein including identification and presentation of contextually relevant productivity features for user access to an electronic document. In some examples, computing system 401 may be a device that a user utilizes to access an application/service in which contextually relevant suggestions are surfaced. When executed by processing system 402, software 405 directs processing system 402 to operate as described herein for at least the various processes, operational scenarios, and sequences discussed in the foregoing implementations. Computing system 401 may optionally include additional devices, features, or functionality not discussed for purposes of brevity.

Referring still to FIG. 4, processing system 402 may comprise processor, a micro-processor and other circuitry that retrieves and executes software 405 from storage system 403. Processing system 402 may be implemented within a single processing device but may also be distributed across multiple processing devices or sub-systems that cooperate in executing program instructions. Examples of processing system 402 include general purpose central processing units, graphical processing units, application specific processors, and logic devices, as well as any other type of processing device, combinations, or variations thereof.

Storage system 403 may comprise any computer readable storage media readable by processing system 402 and capable of storing software 405. Storage system 403 may include volatile and nonvolatile, removable and non-removable media implemented in any method or technology for storage of information, such as computer readable instructions, data structures, program modules, cache memory or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer readable storage media a propagated signal.

In addition to computer readable storage media, in some implementations storage system 403 may also include computer readable communication media over which at least some of software 405 may be communicated internally or externally. Storage system 403 may be implemented as a single storage device but may also be implemented across multiple storage devices or sub-systems co-located or distributed relative to each other. Storage system 403 may comprise additional elements, such as a controller, capable of communicating with processing system 402 or possibly other systems.

Software 405 may be implemented in program instructions and among other functions may, when executed by processing system 402, direct processing system 402 to operate as described with respect to the various operational scenarios, sequences, and processes illustrated herein. For example, software 405 may include program instructions for implementing relevance suggestion components 406 and/or other applications/services of an application platform, as described in the foregoing description.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 405 may include additional processes, programs, or components, such as operating system software, virtual machine software, or other application software. Software 405 may also comprise firmware or some other form of machine-readable processing instructions executable by processing system 402.

In general, software 405 may, when loaded into processing system 402 and executed, transform a suitable apparatus, system, or device (of which computing system 401 is representative) overall from a general-purpose computing system into a special-purpose computing system customized to process data and respond to queries. Indeed, encoding software 405 on storage system 403 may transform the physical structure of storage system 403. The specific transformation of the physical structure may depend on various factors in different implementations of this description. Examples of such factors may include, but are not limited to, the technology used to implement the storage media of storage system 403 and whether the computer-storage media are characterized as primary or secondary storage, as well as other factors.

For example, if the computer readable storage media are implemented as semiconductor-based memory, software 405 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 407 may include communication connections and devices that allow for communication with other computing systems (not shown) over communication networks (not shown). Communication interface system 407 may also be utilized to cover interfacing between processing components described herein. Examples of connections and devices that together allow for inter-system communication may include network interface cards or devices, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 409 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 409. In some cases, the input and output devices may be combined in a single device, such as a display capable of displaying images and receiving touch gestures. The aforementioned user input and output devices are well known in the art and need not be discussed at length here.

User interface system 409 may also include associated user interface software executable by processing system 402 in support of the various user input and output devices discussed above. Separately or in conjunction with each other and other hardware and software elements, the user interface software and user interface devices may support a graphical user interface, a natural user interface, or any other type of user interface, for example, that enables front-end processing of exemplary application/services described herein (including productivity applications/services).

Communication between computing system 401 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:
   determining a context associated with user access to an electronic document by:
      classifying a type of the user access, and
      determining a document creation reference point in a document creation life cycle of the electronic document based on analysis of signal data, collected from one or more applications or services, that comprises signal data pertaining to metadata for the electronic document and signal data pertaining to user interactions with content of the electronic document;
   selecting, from a plurality of productivity features configured to aid task execution within the electronic document, a productivity feature based on analysis of confidence level metrics for the plurality of productivity features that are generated from application of machine learning modeling, wherein the confidence level metrics are scoring values that correlate a relevance of each of the plurality of productivity features with the context based on a collective analysis of a classification of the type of user access and a determination of the document creation reference point in the document creation life cycle of the electronic document;
   determining a level of urgency of notification providing a timing prediction for notifying a user based on an evaluation that collectively analyzes:
      the signal data pertaining to user interactions with content of the electronic document,
      the determination of the document creation reference point in the document creation life cycle of the electronic document, and
      a confidence level metric, of the confidence level metrics, that is generated to indicate a relevance of the productivity feature selected, in the selecting, to the context;
   selecting a format type for presentation of a graphical user interface (GUI) notification from one of: a badge icon notification and a callout notification based on analysis of: the timing prediction associated with the level of urgency of notification and a comparative analysis of the confidence level metric relative to one or more threshold values that correspond with specific format types of user notifications; and
   presenting, through a user interface, a GUI notification associated with the productivity feature based on the format type selected in the selecting and the timing prediction associated with the level of urgency of notification.

2. The method of claim 1, wherein the selecting of the format type for presentation of the GUI notification comprises selecting the badge icon notification when the comparative analysis indicates that the confidence level metric is below a threshold value of the one or more threshold values.

3. The method of claim 1, wherein the selecting of the format type for presentation of the GUI notification comprises selecting the callout notification that overlaps the electronic document when the comparative analysis indicates that the confidence level metric satisfies a threshold value of the one or more threshold values.

4. The method of claim 1, wherein the confidence level metrics for the plurality of productivity features are further determined based on analysis of signal data that comprises one or more selected from a group consisting of: signal data determining a level of user engagement with one or more of the plurality of productivity features based on past actions taken by the user; and signal data identifying one or more of tasks and reminders that are associated with content within the electronic document.

5. The method of claim 1, further comprising: generating the GUI notification based on analysis of the context, the identification of the productivity feature and the type of user interface notification selected.

6. The method of claim 1, wherein the document creation reference point in the document creation life cycle is further determined by analyzing:
   timestamp data indicating a timestamp for creation of the electronic document relative to current timestamp data associated with the user access, and
   signal data explicitly indicating a mode of an application or service that is being used to access the electronic document by the user during a current instance of the user access, wherein the mode of the application or service is a read-only mode or an editing mode.

7. The method of claim 6, wherein the document creation reference point in the document creation life cycle is further determined by analyzing keyword metadata for the electronic document that identifies keywords indicating a finality of the electronic document.

8. The method of claim 6, wherein the document creation reference point in the document creation life cycle is further determined by analyzing signal data identifying one or more of tasks and reminders that are associated with content within the electronic document.

9. A system comprising:
   at least one processor; and
   a memory, operatively connected with the at least one processor, storing computer-executable instructions that, when executed by the at least one processor, causes the at least one processor to execute a method that comprises:
      determining a context associated with user access to an electronic document by:
         classifying a type of the user access, and
         determining a document creation reference point in a document creation life cycle of the electronic document based on analysis of signal data, collected from one or more applications or services, that comprises signal data pertaining to metadata for the electronic document and signal data pertaining to user interactions with content of the electronic document;
      selecting, from a plurality of productivity features configured to aid task execution within the electronic document, a productivity feature based on analysis of confidence level metrics for the plurality of productivity features that are generated from application of machine learning modeling, wherein the confidence level metrics are scoring values that correlate a relevance of each of the plurality of productivity features with the context based on a collective analysis of a classification of the type of user access and a determination of the document creation reference point in the document creation life cycle of the electronic document;
      determining a level of urgency of notification providing a timing prediction for notifying a user based on an evaluation that collectively analyzes:
         the signal data pertaining to user interactions with content of the electronic document,
         the determination of the document creation reference point in the document creation life cycle of the electronic document, and
         a confidence level metric, of the confidence level metrics, that is generated to indicate a relevance of the productivity feature selected, in the selecting, to the context;
      selecting a format type for presentation of a graphical user interface (GUI) notification from one of: a badge icon notification and a callout notification based on analysis of: the timing prediction associated with the level of urgency of notification and a comparative analysis of the confidence level metric relative to one or more threshold values that correspond with specific format types of user notifications; and
      presenting, through a user interface, a GUI notification associated with the productivity feature based on the format type selected in the selecting and the timing prediction associated with the level of urgency of notification.

10. The system of claim 9, wherein the selecting of the format type for presentation of the GUI notification comprises selecting the badge icon notification when the comparative analysis indicates that the confidence level metric is below a threshold value of the one or more threshold values.

11. The system of claim 9, wherein the selecting of the format type for presentation of the GUI notification comprises selecting the callout notification that overlaps the electronic document when the comparative analysis indicates that the confidence level metric satisfies a threshold value of the one or more threshold values.

12. The system of claim 9, wherein the confidence level metrics for the plurality of productivity features are further determined based on analysis of signal data that comprises one or more selected from a group consisting of: signal data determining a level of user engagement with one or more of the plurality of productivity features based on past actions taken by the user; and signal data identifying one or more of tasks and reminders that are associated with content within the electronic document.

13. The system of claim 9, wherein the method, executed by the at least one processor, further comprises: generating the GUI notification based on analysis of the context, the identification of the productivity feature and the type of user interface notification selected.

14. The system of claim 9, wherein the document creation reference point in the document creation life cycle is further determined by analyzing:
   timestamp data indicating a timestamp for creation of the electronic document relative to current timestamp data associated with the user access, and
   signal data explicitly indicating a mode of an application or service that is being used to access the electronic document by the user during a current instance of the user access, wherein the mode of the application or service is a read-only mode or an editing mode.

15. The system of claim 14, wherein the document creation reference point in the document creation life cycle is further determined by analyzing keyword metadata for the electronic document that identifies keywords indicating a finality of the electronic document.

16. The system of claim 14, wherein the document creation reference point in the document creation life cycle is further determined by analyzing signal data identifying one or more of tasks and reminders that are associated with content within the electronic document.

17. A computer-readable storage media storing computer-executable instructions that, when executed by at least one processor, causes the at least one processor to execute a method comprising:
- determining a context associated with user access to an electronic document by:
  - classifying a type of the user access, and
  - determining a document creation reference point in a document creation life cycle of the electronic document based on analysis of signal data, collected from one or more applications or services, that comprises signal data pertaining to metadata for the electronic document and signal data pertaining to user interactions with content of the electronic document;
- selecting, from a plurality of productivity features configured to aid task execution within the electronic document, a productivity feature based on analysis of confidence level metrics for the plurality of productivity features that are generated from application of machine learning modeling, wherein the confidence level metrics are scoring values that correlate a relevance of each of the plurality of productivity features with the context based on a collective analysis of a classification of the type of user access and a determination of the document creation reference point in the document creation life cycle of the electronic document;
- determining a level of urgency of notification providing a timing prediction for notifying a user based on an evaluation that collectively analyzes:
  - the signal data pertaining to user interactions with content of the electronic document,
  - the determination of the document creation reference point in the document creation life cycle of the electronic document, and
  - a confidence level metric, of the confidence level metrics, that is generated to indicate a relevance of the productivity feature selected, in the selecting, to the context;
- selecting a format type for presentation of a graphical user interface (GUI) notification from one of: a badge icon notification and a callout notification based on analysis of: the timing prediction associated with the level of urgency of notification and a comparative analysis of the confidence level metric relative to one or more threshold values that correspond with specific format types of user notifications; and
- presenting, through a user interface, a GUI notification associated with the productivity feature based on the format type selected in the selecting and the timing prediction associated with the level of urgency of notification.

18. The computer-readable storage media of claim 17, wherein the document creation reference point in the document creation life cycle is further determined by analyzing:
- timestamp data indicating a timestamp for creation of the electronic document relative to current timestamp data associated with the user access, and
- signal data explicitly indicating a mode of an application or service that is being used to access the electronic document by the user during a current instance of the user access, wherein the mode of the application or service is a read-only mode or an editing mode.

19. The computer-readable storage media of claim 18, wherein the document creation reference point in the document creation life cycle is further determined by analyzing keyword metadata for the electronic document that identifies keywords indicating a finality of the electronic document.

20. The computer-readable storage media of claim 18, wherein the document creation reference point in the document creation life cycle is further determined by analyzing signal data identifying one or more of tasks and reminders that are associated with content within the electronic document.

* * * * *